(12) United States Patent
Lucht (10) Patent No.: US 8,074,314 B2
(45) Date of Patent: Dec. 13, 2011

(54) HINGED RAMP ASSEMBLY

(76) Inventor: Duane Lucht, Winnipeg (CA)

( * ) Notice: Subject to any disclaimer, the term of this patent is extended or adjusted under 35 U.S.C. 154(b) by 152 days.

(21) Appl. No.: 12/535,164

(22) Filed: Aug. 4, 2009

(65) Prior Publication Data

US 2009/0300859 A1 Dec. 10, 2009

(51) Int. Cl.
*E01D 1/00* (2006.01)
(52) U.S. Cl. ........................................................ 14/69.5
(58) Field of Classification Search ............... 16/261, 16/262, 270; 14/69.5; D34/32; 254/88; 119/847, 849; 414/537
See application file for complete search history.

(56) References Cited

U.S. PATENT DOCUMENTS

| | | | |
|---|---|---|---|
| 4,795,304 A | 1/1989 | Dudley | |
| 4,979,867 A | 12/1990 | Best | |
| D338,760 S * | 8/1993 | Harrah | D34/32 |
| D401,731 S * | 11/1998 | Jeruss | D34/32 |
| 5,988,725 A | 11/1999 | Cole | |
| 6,119,634 A * | 9/2000 | Myrick | 119/847 |
| 6,139,249 A * | 10/2000 | Lucht | 414/537 |
| 6,764,123 B1 | 7/2004 | Bilyard | |
| 7,237,294 B2 * | 7/2007 | Lensing | 14/69.5 |
| 7,299,517 B1 | 11/2007 | Adinolfe | |
| D617,972 S * | 6/2010 | Lucht | D34/32 |
| 2004/0022613 A1 * | 2/2004 | Kellogg et al. | 414/537 |

* cited by examiner

*Primary Examiner* — Gary S Hartmann
(74) *Attorney, Agent, or Firm* — Ryan W. Dupuis; Kyle R. Satterthwaite; Ade & Company, Inc.

(57) ABSTRACT

A ramp is assembled from first and second boards such that the first and second boards are foldable relative to one another. Rail assemblies comprising first and second channels are fastened along opposing sides of the boards. First and second hinge members, fastened to the sides of the first and second channels, pivotally couple the channels. Two central hinge members are mounted on the boards respectively to pivotally couple the boards at a central location between the opposing sides of the boards. An auxiliary hinge member is supported on the bottom of the first channels to provided added support to the pivotal coupling between the first and second channels. The auxiliary hinge member and the central hinge members are interchangeable with one another.

7 Claims, 5 Drawing Sheets

HINGED RAMP ASSEMBLY

FIELD OF THE INVENTION

The present invention relates to a ramp assembly formed from a kit of parts including hinged side rail assemblies for pivotally coupling a pair of boards in an end to end configuration by fastening the side rail assemblies along opposing sides of the boards.

BACKGROUND

Many examples of ramp structures can be found in the prior art which differ considerably in design. For a manufacturer, it is desirable to design a ramp which is of low cost to manufacture, which makes use of readily available materials, and which has sufficient strength for many different applications when sold to customers. Due to the large size of many ramp structures, it is further desirable for ramps to be foldable into a collapsed storage position.

The following U.S. patents disclose various examples of folding ramp structures: U.S. Pat. No. 6,764,123 belonging to Bilyard; U.S. Pat. No. 5,988,725 belonging to Cole; U.S. Pat. No. 7,299,517 belonging to Adinolfe; U.S. Pat. No. 4,795,304 belonging to Dudley and U.S. Pat. No. 4,979,867 belonging to Best. In the prior art, known designs for ramp structures typically require custom manufacturing of many complex parts so that the resulting ramp structure is both costly to make and ship to customers.

SUMMARY OF THE INVENTION

According to one aspect of the invention there is provided a ramp kit arranged for assembling first and second board sections into an assembled ramp structure, the kit comprising:
  a pair of hinged side rail assemblies arranged to extend along opposing sides of the first and second board sections in the assembled ramp structure, each assembly comprising:
    a first channel member comprising a side wall extending in a longitudinal direction of the first channel member from an inner end to an outer end of the first channel and a fastener flange oriented perpendicularly to the side wall and extending in the longitudinal direction along the side wall, the fastener flange including a plurality of fastener apertures therein at spaced positions in the longitudinal direction arranged for fastening to a respective one of the opposing sides of the first board section;
    a second channel member comprising a side wall extending in a longitudinal direction of the first channel member from an inner end to an outer end of the second channel and a fastener flange oriented perpendicularly to the side wall and extending in the longitudinal direction along the side wall, the fastener flange including a plurality of fastener apertures therein at spaced positions in the longitudinal direction arranged for fastening to a respective one of the opposing sides of the second board section;
    a first hinge member arranged to be supported on the side wall at the inner end of the first channel;
    a second hinge member arranged to be supported on the side wall at the inner end of the second channel;
    an auxiliary hinge member arranged to be supported on the fastening flange of the first channel; and
    a hinge pin arranged to pivotally couple the second hinge member between the first hinge member and the auxiliary hinge member so as to be arranged for relative pivotal movement of the first hinge member and the auxiliary hinge member with the first channel member relative to the second hinge member and the second channel member.

According to a second aspect of the present invention there is provided a ramp structure comprising:
  first and second board sections comprising opposing sides arranged to extend in a longitudinal direction between opposing ends of the board sections;
  a pair of hinged side rail assemblies arranged to pivotally support the first and second board sections relative to one another in an end to end configuration, each side rail assembly extending along respective ones of the opposing sides of the first and second board sections and comprising:
    a first channel member comprising a side wall extending in a longitudinal direction of the first channel member from an inner end to an outer end of the first channel and a fastener flange oriented perpendicularly to the side wall and extending in the longitudinal direction along the side wall, the fastener flange including a plurality of fastener apertures therein at spaced positions in the longitudinal direction;
    a plurality of fasteners received through the fastener apertures in the first channel member and fastened to a respective one of the opposing sides of the first board section;
    a second channel member comprising a side wall extending in a longitudinal direction of the first channel member from an inner end to an outer end of the second channel and a fastener flange oriented perpendicularly to the side wall and extending in the longitudinal direction along the side wall, the fastener flange including a plurality of fastener apertures therein at spaced positions in the longitudinal direction;
    a plurality of fasteners received through the fastener apertures in the second channel member and fastened to a respective one of the opposing sides of the second board section;
    a first hinge member arranged to be supported on the side wall at the inner end of the first channel;
    a second hinge member arranged to be supported on the side wall at the inner end of the second channel;
    an auxiliary hinge member arranged to be supported on the fastening flange of the first channel; and
    a hinge pin arranged to pivotally couple the second hinge member between the first hinge member and the auxiliary hinge member so as to be arranged for relative pivotal movement of the first hinge member and the auxiliary hinge member with the first channel member relative to the second hinge member and the second channel member.

By providing a ramp which is assembled from a ramp kit and readily available material such as wooden boards and the like, the resulting ramp structure is of low cost to manufacture and ship to customers as a kit of parts. Furthermore the structure of the hinges arranged to be secured both to a side wall and a perpendicular fastener flange of one of the channel members provides considerable additional strength to the assembled ramp structure even when assembled from readily available materials including plywood and the like fastened to manufactured rail assemblies. By further arranging a central hinge to be provided for attachment directly between wooden boards in which components of the central hinge are interchangeable with some components of the hinges on the side rail assemblies, further added strength is provided to the assembled ramp structure while maintaining the components of the kit of parts used to assemble the ramp structure simple and low in cost to manufacture.

Each of the first and second hinge members may comprise a hinge plate locating a hinge aperture therein and arranged to be coupled parallel and adjacent to the hinge plate of the other hinge member of the respective side rail assembly by a hinge pin received through the hinge aperture.

Each of the first and second hinge members may include a fastener flange projecting from the hinge plate which includes a plurality of fastener apertures therein arranged therein to receive fasteners therethrough for connection to cooperating apertures formed in the side walls of the respective channel members.

The hinge plate and the fastener flange of each of the first and second hinge members are preferably commonly formed with one another in a generally common plane.

Each of the first and second hinge members may further comprise an inner flange oriented perpendicularly to the fastener flange and which is arranged to overlap the inner end of the respective channel member when the fastener flange is fastened to the side wall of the channel member.

The first and second hinge members may each further comprise a top flange oriented perpendicularly to the fastener flange and which is arranged to overlap a top flange of the respective channel member which is opposite the fastener flange of the channel member when the fastener flange of the hinge member is fastened to the side wall of the channel member.

Each auxiliary hinge member may comprise a fastener flange oriented perpendicularly to the hinge plate and which includes a plurality of fastener apertures therein arranged for fastening the auxiliary hinge members to the fastener flanges of the respective channel members.

When assembling a wider ramp, there may also be provided a central hinge assembly comprising a first central hinge member arranged to be fastened to the first board section spaced between the first channel members of the side rail assemblies, a second central hinge member arranged to be fastened to the second board section spaced between the second channel members of the side rail assemblies and a hinge pin arranged to pivotally couple the first central hinge member to the second central hinge member.

Each central hinge member may comprise a hinge plate locating a hinge aperture therein such that the hinge pin is arranged to be received through the hinge apertures to pivotally couple the hinge plates of the first and second central hinge members parallel and adjacent to one another, and a fastener flange oriented perpendicularly to the hinge plate and which includes a plurality of fastener apertures therein arranged for receiving fasteners therethrough such that the first and second central hinge members are arranged for fastening directly to the first and second board sections.

The first and second central hinge members may be identical in configuration to one another.

The first central hinge member, the second central hinge member and the auxiliary hinge members of the side rail assemblies may be interchangeable with one another.

According to a further aspect of the present invention there is provided a ramp kit arranged for assembling first and second board sections into an assembled ramp structure, the kit comprising:

a pair of hinged side rail assemblies arranged to extend along opposing sides of the first and second board sections in the assembled ramp structure, each assembly comprising:

a first channel member comprising a side wall extending in a longitudinal direction of the first channel member from an inner end to an outer end of the first channel and a fastener flange oriented perpendicularly to the side wall and extending in the longitudinal direction along the side wall, the fastener flange including a plurality of fastener apertures therein at spaced positions in the longitudinal direction arranged for fastening to a respective one of the opposing sides of the first board section;

a second channel member comprising a side wall extending in a longitudinal direction of the first channel member from an inner end to an outer end of the second channel and a fastener flange oriented perpendicularly to the side wall and extending in the longitudinal direction along the side wall, the fastener flange including a plurality of fastener apertures therein at spaced positions in the longitudinal direction arranged for fastening to a respective one of the opposing sides of the second board section;

a first hinge member arranged to be supported on the side wall at the inner end of the first channel;

a second hinge member arranged to be supported on the side wall at the inner end of the second channel;

an auxiliary hinge member arranged to be supported on the fastening flange of the first channel; and a hinge pin arranged to pivotally couple the second hinge member between the first hinge member and the auxiliary hinge member so as to be arranged for relative pivotal movement of the first hinge member and the auxiliary hinge member with the first channel member relative to the second hinge member and the second channel member; and a central hinge assembly comprising:

a first central hinge member arranged to be fastened to the first board section spaced between the first channel members of the side rail assemblies;

a second central hinge member arranged to be fastened to the second board section spaced between the second channel members of the side rail assemblies;

a hinge pin arranged to pivotally coupled the first central hinge member to the second central hinge member so as to be arranged for relative pivotal movement of the first central hinge member with the first board and the first hinge members of side rail assemblies relative to the second central hinge member, the second board and the second hinge members of the side rails assemblies;

the first central hinge member, the second central hinge member and the auxiliary hinge member of the side rail assemblies being interchangeable with one another.

One embodiment of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Referring to the accompanying figures there is illustrated a kit of parts arranged for assembling a plurality of board sections 10 into an assembled ramp structure 12.

The board sections 10 typically comprise wooden planks or sheets, for example plywood boards which are ¾ of an inch in thickness and which are cut to span laterally in the range of several feet and to span longitudinally between three and six feet each for example. First and second board sections 10 are provided which each have two longitudinal sides 14 opposite one another to extend in the longitudinal direction between the opposed ends 16 of the boards.

The kit of parts is arranged to assemble the two board sections in an end to end configuration extending in the longitudinal direction for relative pivotal movement about a horizontal axis extending in a lateral direction perpendicular to the longitudinal direction of the ramp. When supported in use, the two boards are arranged to be substantially coplanar with one another while remaining pivotal relative to one another to be folded into a storage position in which the two boards are folded alongside one another.

The kit generally comprises two side rail assemblies 18 arranged to be secured along opposing sides 14 of the board sections to extend along a full length of the ramp structure in the longitudinal direction thereof, and one or more central hinge assemblies 20 which may optionally be supported between the two side rail assemblies to further couple the first and second board sections 10 to one another for relative pivotal movement.

Each side rail assembly 18 includes a first channel member 22 arranged to be secured along the respective side 14 of the first board and a second channel member 24 arranged to be secured along the respective side 14 of the second board section 10.

Each of the first and second channel members comprises a side wall 26 extending in the longitudinal direction of the rail assembly between an inner end 28 for abutment against the inner end of the other channel member, and an outer end 30 at the end of the assembled ramp structure. The side wall 26 is arranged to be substantially vertically oriented perpendicular to the surface of the board sections forming the ramp surface. The side walls 26 are coupled to the board sections by respective fastener flanges 32 extending along one edge of each of the side walls of the channel members to extend along a full length of the side wall in the longitudinal direction at an orientation extending perpendicularly inward from the respective edge of the side wall 26. A plurality of fastener apertures 34 are provided at spaced positions in the longitudinal direction along the length of the fastener flange 32 so as to receive suitable fasteners therethrough which permit fastening of the fastener flange 32 to a respective surface of the board sections 10 forming the ramp surface. The fastener flanges are arranged so that fasteners are received therethrough for fastening to the board sections when the side wall 26 is abutted along the respective side 14 of the board to which it is fastened.

Figure 1:
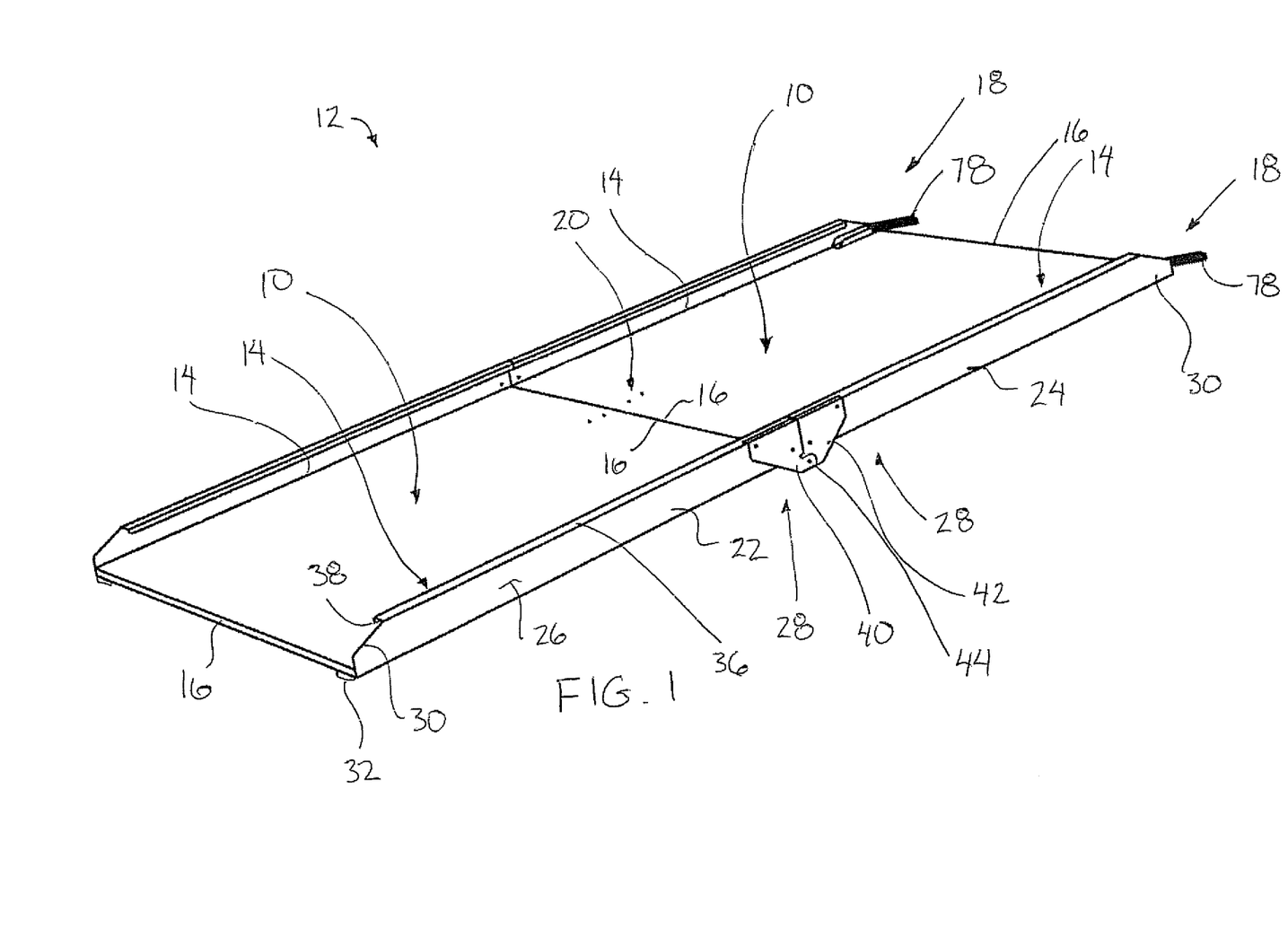
FIG. 1 is a perspective view of the assembled ramp structure according to the present invention.
Figure 2:
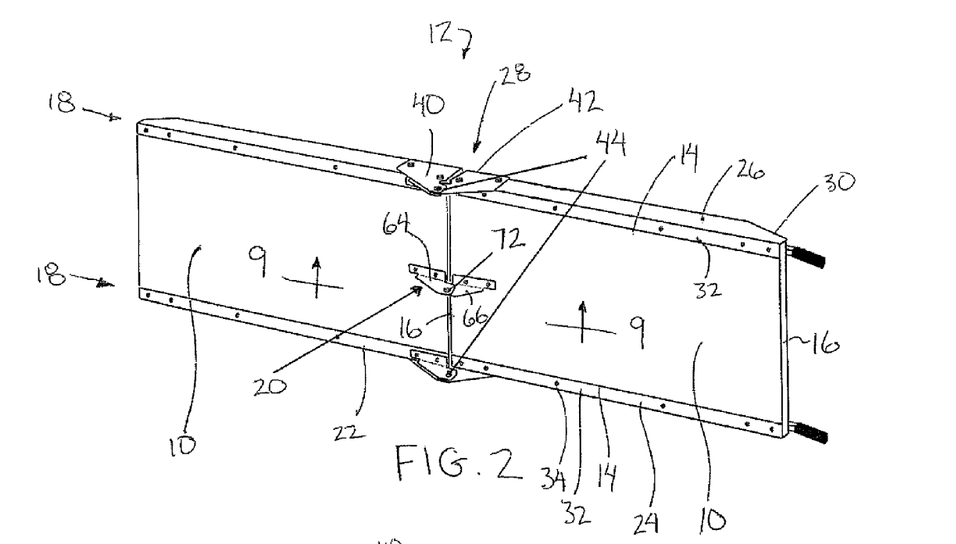
FIG. 2 is a perspective view of the assembled ramp structure shown turned on its side.
Figure 3:
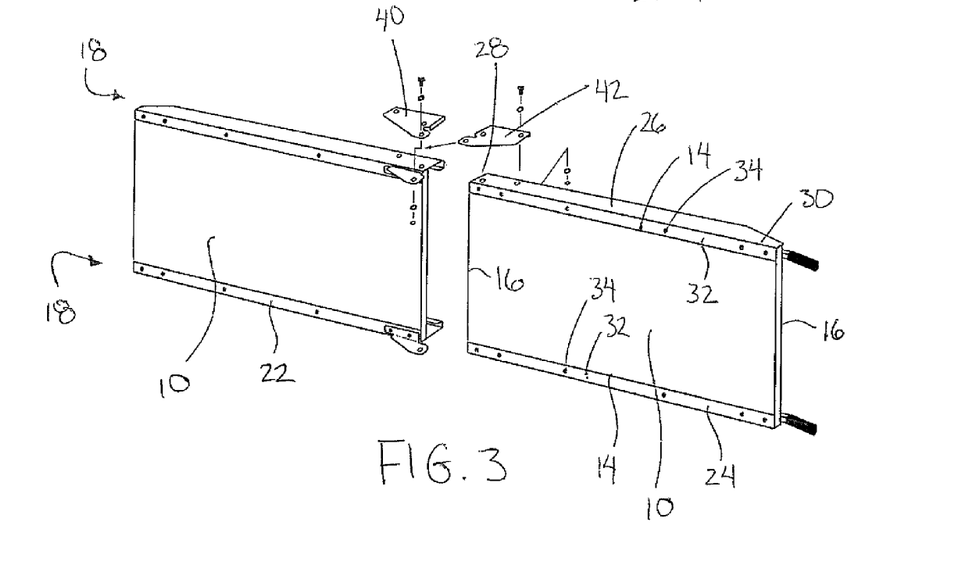
FIG. 3 is an exploded perspective view of the ramp structure in the orientation of FIG. 2.
Figure 4:
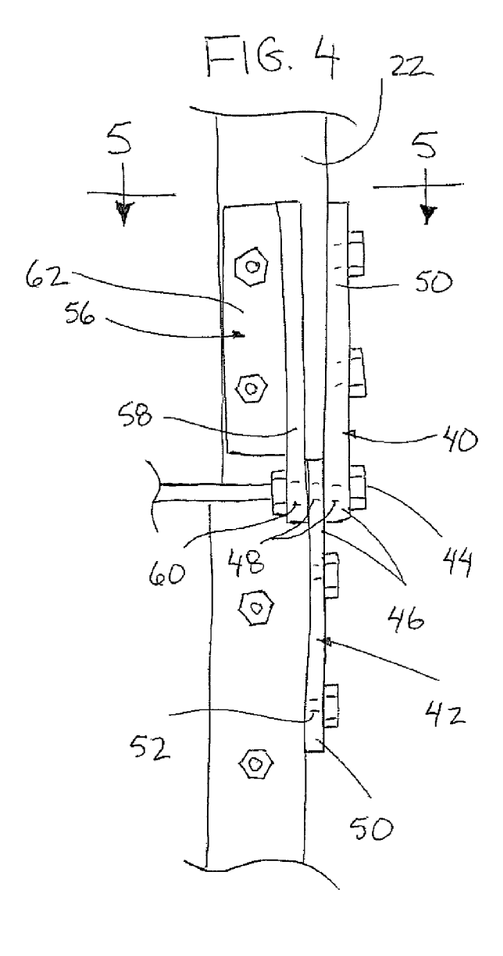
FIG. 4 is a bottom plan view of the hinge members of one of the side rail assemblies in an unfolded in use position of the assembled ramp structure.
Figure 5:
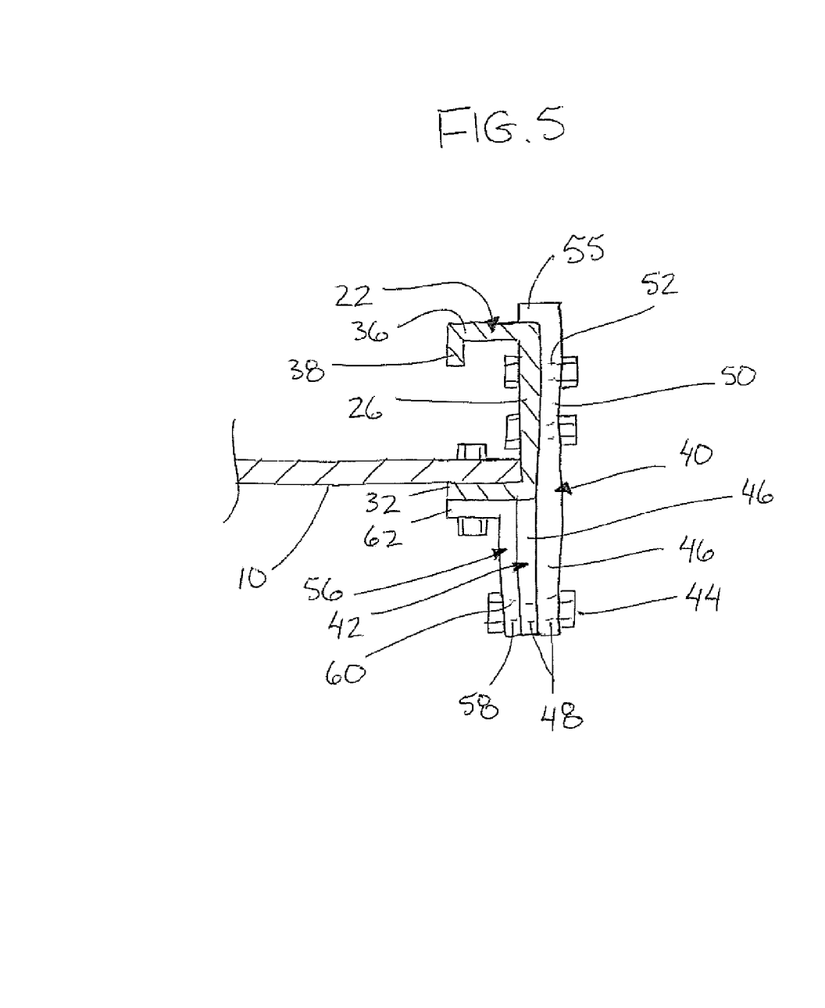
FIG. 5 is a sectional view along the line 5-5 of FIG. 4.
Figure 6:
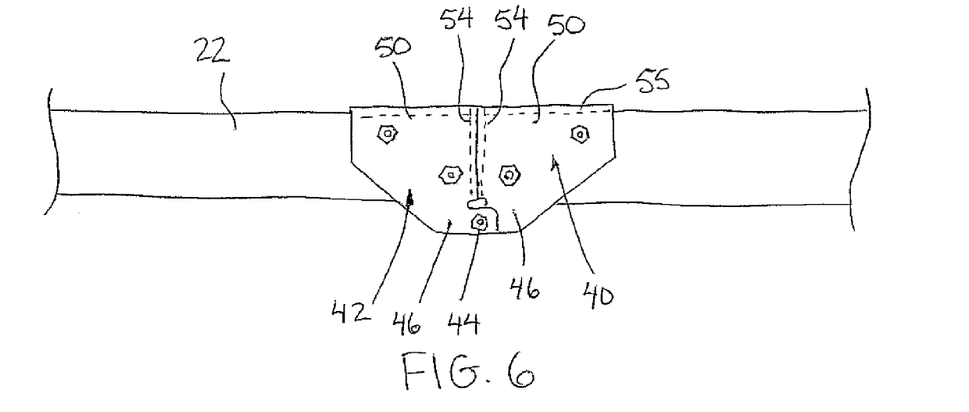
FIG. 6 is a side elevational view of the hinge members of one of the side rail assemblies.
Figure 7:
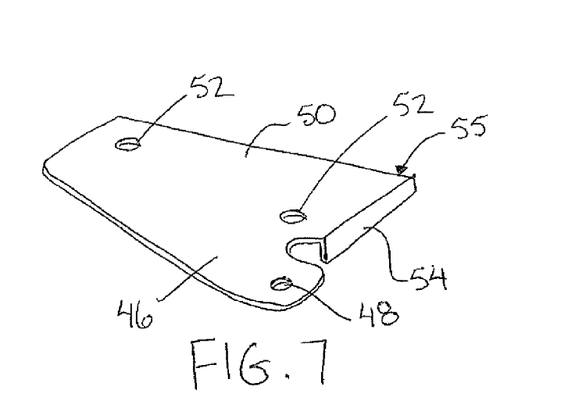
FIG. 7 is a perceptive view of one of the hinge members of the side rail assemblies.
Figure 8:
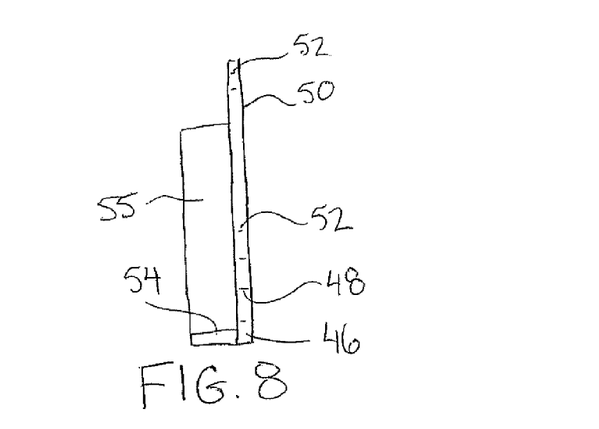
FIG. 8 is an end elevational view of the hinge member of FIG. 7.
Figure 9:
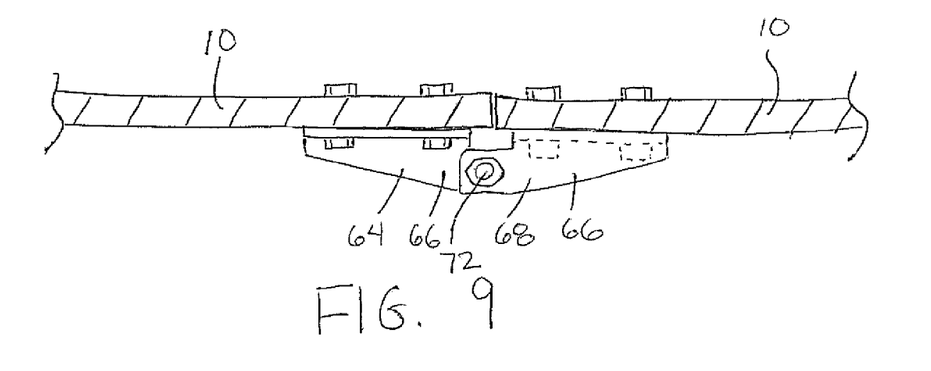
FIG. 9 is a side elevational view of one of the central hinge members.
Figure 10:
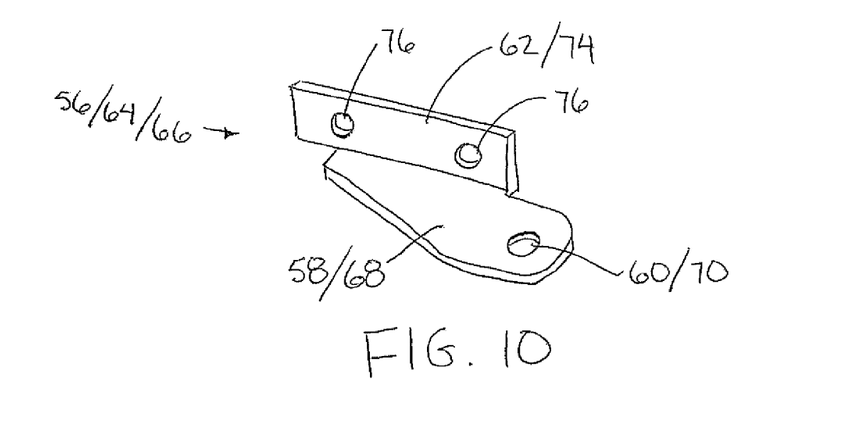
FIG. 10 is a perspective view of the central hinge member of FIG. 9.
Figure 11:
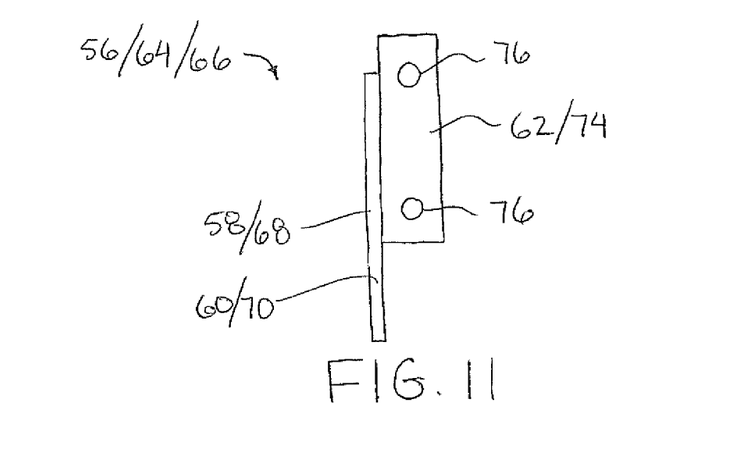
FIG. 11 is a top plan view of the central hinge member of FIG. 9.

Each of the channel members 22 and 24 further includes a top flange 36 extending perpendicularly inward from the side wall 26 upon which it is supported so as to extend generally parallel to the fastener flange 32 along an opposing top side of the side wall 26 relative to the fastener flange at the bottom side as shown in FIG. 5. A free edge 38 of the top flange 36 is bent inwardly towards the fastener flange 32 to remove the sharp edge on the top flange and to provide a longitudinally extending fold in the top flange which further increases the bending strength thereof for strengthening the assembled ramp structure.

The side walls 26 of both the first and channel members are tapered at the outer end thereof so as to be reduced in vertical height as measured from the fastener flange extending outwardly to the outer end of the channel. A majority of the length of the side walls has a common height with the inner ends being formed straight and perpendicular to the longitudinal direction of the side rails so that the inner ends of the first channel members 22 are arranged for abutment against the similarly formed inner ends of the respective second channel members 24.

Each side rail assembly further includes a first hinge member 40 supported at the inner end of the first channel member 22 on the side wall 26 of the first channel and a second hinge member 42 supported at the inner end of the second channel member 24 on the side wall 26 thereof. The first and second hinge members are arranged to be pivotally coupled to one another so that when the first board is supported along opposing sides 14 thereof on the fastener flanges of the two first channel members and the second board is secured along opposing sides 14 thereof along the respective fastener flanges of the second channel members 24 the first and second board sections are effectively pivotally coupled to one another for relative pivotal movement about the lateral axis of pivotal movement as defined by the pivotal coupling between the first and second hinge members.

A hinge pin 44 in the form of a bolt or other suitable fastener is used to pivotally couple the first hinge member 40 to the second hinge member 42 of each side rail assembly 18 such that the two first hinge members of the two first channel members and the first board section are commonly pivoted together relative to the second hinge members of the second channel members and the second board about the lateral axis between the in use position and the storage position.

The first and second hinge members 40 and 42 are mirror images of one another. Each of the first and second hinge members comprises a hinge plate 46 comprising a flat plate including a hinge aperture 48 located therein for receiving the hinge pin 44 therethrough. Each hinge member also includes a fastener flange 50 which is formed commonly and coplanar with the hinge plate 46 and which locates a pair of longitudinally spaced apart fastener apertures 52 therein. The fastener apertures 52 receive suitable fasteners therethrough for cooperation with fastener apertures spaced apart in a longitudinal direction in the side wall at the inner end of the respective channel member upon which it is mounted so that the hinge plate 46 of each hinge member is parallel to the respective side wall upon which it is supported. Both the hinge plate 46 and the fastener flange 50 of the first and second hinge members are arranged to be oriented perpendicularly to the lateral axis of relative pivotal movement between the first and second board sections.

Each of the first and second hinge members 40 and 42 also includes an inner flange 54 extending along an inner edge of the respective fastener flange 50 to extend perpendicularly inward from the fastener flange so as to be arranged for abutment along the respective inner end of the channel member upon which the fastener flange is mounted. In the mounted position of the hinge members, the inner flanges 54 thereof overlap the inner ends of the respective channels upon which they are mounted for abutting opposing ones of the inner flanges in the in use position.

Each of the first and second hinge members 40 and 42 further includes a top flange 55 extending along a top edge of the respective fastener flange 50, opposite the hinge aperture 48, to extend perpendicularly inward from the fastener flange and perpendicularly to the inner flange 54. The top flange 55 is arranged for abutment along the top flange at the top side of the respective channel member 22 or 24 to provide added structural support to the hinge connection.

The hinge plate 46 and the hinge aperture 48 located therein of each of the first and second hinge members is arranged to be located by alignment of the fastener apertures with the cooperating apertures in the side walls of the channel members, and abutment of the top and inner flanges to respective mating surface of the channel members so that the plates extend across and downwardly beyond the deck surface of the boards supported on the fastener flanges of the channel members.

Each side rail assembly further includes an auxiliary hinge member 56 supported on each of the first channel members 22. Each hinge member comprises a hinge plate 58 locating a hinge aperture 60 therein for receiving the respective hinge pin 44 of the first and second hinge members noted above. A fastener flange 62 is coupled to the hinge plate along one edge thereof so as to be oriented perpendicularly to the hinge plate. Two fastener apertures are longitudinally spaced apart in the fastener flange 62 to receive suitable fasteners therethrough for fastening to cooperating apertures in the fastener flange of the first channel member 22 which are aligned when the hinge aperture 60 is aligned with the hinge aperture of the first and second hinge members. The fasteners flanges of the auxiliary hinge members are thus arranged to be directly fastened to the respective channel members which are arranged to be directly fastened to one the respective board sections by common fasteners extending through the board sections and the fastener flanges of both the respective channel member and the respective auxiliary hinge member.

The auxiliary hinge member 56 is supported on the fastener flange of the first channel member such that the hinge plate of the second hinge member is arranged to be received parallel to and in abutment between the hinge plate of the first hinge member 40 and the hinge plate 58 of the auxiliary hinge member so that a common hinge pin 44 is received through the three hinge plates at each side rail assembly. The auxiliary hinge member 56 is fastened to the first channel member for pivotal movement with the first channel member, the first hinge member and the first board upon which they are supported relative to the second hinge member, the second channel member and the second board upon which they are supported.

As noted above the central hinge assembly 20 is arranged to be coupled between the first and second board sections 10 to be evenly spaced between the side rail assemblies 18 to similarly support the first and second boards for relative pivotal movement about the common lateral axis.

Each central hinge assembly 20 comprises a first central hinge member 64 and a second central hinge member 66 which are arranged to be fastened to the first and second board sections 10 respectively. Each of the central hinge members comprises a hinge plate 68 locating a hinge aperture 70 therein in which the two hinge plates are arranged to be pivotally coupled together by a hinge pin 72, typically in the form of a bolt, through the hinge aperture at the lateral axis so that the hinge plates 68 of the first and second central hinge member are coupled adjacent to one another and parallel to one another similarly to the hinge members of the side rail assemblies. Each central hinge member further includes a fastener flange 74 extending along one edge of the hinge plate 68 to project perpendicularly thereto. Each fastener flange 74 includes two spaced apart fastener apertures 76 formed therein arranged to receive suitable fasteners which permit the first and second central hinge members to be secured directly to the first and second board sections by receiving fasteners through the apertures 76.

The first and second central hinge members are arranged to be identical in configuration to the auxiliary hinge members of the side rails assemblies so that the central hinge members and the auxiliary hinge members are arranged to be interchangeable with one another. Accordingly a single manufactured component can be used either as a central hinge for added support when using large widths of board sections to form the ramps or to provide auxiliary support to reinforce one of the hinges of the side rail assemblies by securing hinge members, which are already secured to side walls of the channel members, also to the fastener flanges of the channel members.

In use a kit is provided which makes use of two board sections 10 typically in the form of plywood which can be purchased separately from the kit of parts by a customer. A user initially cuts the plywood boards to match the length of the channel members of the side rail assemblies and to have a width which meets the desired overall width of the assembled ramp structure to be assembled. The fastener flanges of the channel members can then be secured along opposing sides 14 of the board sections respectively. The first and second hinge members of the side rail assemblies are then fastened to the side walls of the channel members and the auxiliary hinge members are supported on the fastener flanges oriented perpendicularly to the side walls supporting the first and second hinge members thereon. Suitable hinge pins secure all of the hinge plates of each side rail assembly together respectively for pivotal movement about a common lateral axis. When using large widths of ramps, one or more central hinges are provided by attaching the first and second central hinge members to the board sections by suitable fasteners through the fastener flanges thereof. A suitable hinge pin couples the first and second central hinge members of each central hinge assembly at the lateral axis of pivotal movement to provide additional support between the two board sections at a central location between the two side rail assemblies.

Additional finger projections 78 are mounted to project generally in the longitudinal direction outward from the outer ends of one of the first or second channel members so as to be arranged for gripping onto a suitable supporting surface to which the upper end of the assembled ramp structure is to be supported on in use.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A ramp kit in combination with a first board section and a second board section such that the first and second board sections are assembled into an assembled ramp structure, the kit comprising:

a pair of hinged side rail assemblies extending along opposing sides of the first and second board sections in the assembled ramp structure, each assembly comprising:

a first channel member comprising a side wall extending in a longitudinal direction of the first channel member from an inner end to an outer end of the first channel and a fastener flange oriented perpendicularly to the side wall and extending in the longitudinal direction along the side wall, the fastener flange including a plurality of fastener apertures therein at spaced positions in the longitudinal direction receiving fasteners which are fastened to a respective one of the opposing sides of the first board section;

a second channel member comprising a side wall extending in a longitudinal direction of the first channel member from an inner end to an outer end of the second channel and a fastener flange oriented perpendicularly to the side wall and extending in the longitudinal direction along the side wall, the fastener flange including a plurality of fastener apertures therein at spaced positions in the longitudinal direction receiving fasteners which are fastened to a respective one of the opposing sides of the second board section;

a first hinge member supported on the side wall at the inner end of the first channel;

a second hinge member supported on the side wall at the inner end of the second channel;

an auxiliary hinge member supported on the fastening flange of the first channel; and a hinge pin pivotally coupling the second hinge member between the first hinge member and the auxiliary hinge member so as to be arranged for relative pivotal movement of the first hinge member and the auxiliary hinge member with the first channel member relative to the second hinge member and the second channel member; and a central hinge assembly comprising:

a first central hinge member fastened to the first board section spaced between the first channel members of the side rail assemblies;

a second central hinge member fastened to the second board section spaced between the second channel members of the side rail assemblies;

a hinge pin pivotally coupling the first central hinge member to the second central hinge member so as to be arranged for relative pivotal movement of the first central hinge member with the first board and the first hinge members of side rail assemblies relative to the second central hinge member, the second board and the second hinge members of the side rails assemblies;

each auxiliary hinge member comprising a hinge plate locating a hinge aperture therein and being coupled parallel and adjacent to the hinge plate of the other hinge members of the respective side rail assembly by the respective hinge pin and a fastener flange oriented perpendicularly to the hinge plate which includes a plurality of fastener apertures therein receiving fasteners which fasten the auxiliary hinge members to the fastener flanges at a bottom side of the respective channel members;

each central hinge member comprising a hinge plate locating a hinge aperture therein such that the hinge pin is received through the hinge apertures to pivotally couple the hinge plates of the first and second central hinge members parallel and adjacent to one another and a fastener flange oriented perpendicularly to the hinge plate which includes a plurality of fastener apertures receiving fasteners therethrough which fasten the first and second central hinge members directly to the first and second board sections; and the first central hinge member, the second central hinge member and the auxiliary hinge member of the side rail assemblies being interchangeable with one another.

2. The ramp kit according to claim 1 wherein each of the first and second hinge members comprises a hinge plate locating a hinge aperture therein and arranged to be coupled parallel and adjacent to the hinge plate of the other hinge member of the respective side rail assembly by a hinge pin received through the hinge aperture.

3. The ramp kit according to claim 2 wherein each of the first and second hinge members includes a fastener flange projecting from the hinge plate and including a plurality of fastener apertures therein arranged therein to receive fasteners therethrough for connection to cooperating apertures formed in the side walls of the respective channel members.

4. The ramp kit according to claim 3 wherein the hinge plate and the fastener flange of each of the first and second hinge members are commonly formed with one another in a generally common plane.

5. The ramp kit according to claim 3 wherein each of the first and second hinge members comprises an inner flange oriented perpendicularly to the fastener flange which is arranged to overlap the inner end of the respective channel member when the fastener flange of the hinge member is fastened to the side wall of the channel member.

6. The ramp kit according to claim 3 wherein each of the first and second hinge members comprises a top flange oriented perpendicularly to the fastener flange which is arranged to overlap a top flange of the respective channel member which is opposite the fastener flange of the channel member when the fastener flange of the hinge member is fastened to the side wall of the channel member.

7. The ramp kit according to claim 1 wherein the first and second central hinge members are identical in configuration to one another.

* * * * *